(12) United States Patent
Ortiz et al.

(10) Patent No.: US 10,694,828 B2
(45) Date of Patent: Jun. 30, 2020

(54) AUTOMATIC NAIL PAINTING MACHINE

(71) Applicants: Miguel Ortiz, Santo Domingo (DO);
Jose Ortiz, Santo Domingo (DO);
Manuel Sori, Santo Domingo (DO);
Hoyma Mazara, Santo Domingo (DO)

(72) Inventors: Miguel Ortiz, Santo Domingo (DO);
Jose Ortiz, Santo Domingo (DO);
Manuel Sori, Santo Domingo (DO);
Hoyma Mazara, Santo Domingo (DO)

( * ) Notice: Subject to any disclaimer, the term of this patent is extended or adjusted under 35 U.S.C. 154(b) by 0 days.

(21) Appl. No.: 15/651,291

(22) Filed: Jul. 17, 2017

(65) Prior Publication Data

US 2019/0208884 A1    Jul. 11, 2019

Related U.S. Application Data

(63) Continuation-in-part of application No. 14/375,378, filed as application No. PCT/IB2013/060784 on Dec. 11, 2013, now abandoned.
(Continued)

(30) Foreign Application Priority Data

Dec. 12, 2012   (DO) ................................ P 2012 311

(51) Int. Cl.
*A45D 29/00*    (2006.01)
*A45D 29/14*    (2006.01)
(Continued)

(52) U.S. Cl.
CPC ........... *A45D 29/004* (2013.01); *A45D 29/14* (2013.01); *G06F 3/0412* (2013.01); *G06F 3/0416* (2013.01); *G09G 3/32* (2013.01)

(58) Field of Classification Search
CPC ...... A45D 29/004; G09G 3/32; G06F 3/0412; G06F 3/0416; B41F 17/30; B41F 17/34
See application file for complete search history.

(56) References Cited

U.S. PATENT DOCUMENTS

| | | | | |
|---|---|---|---|---|
| 6,035,860 A | * | 3/2000 | Mombourquette | .... A45D 29/00 132/200 |
| 6,286,571 B1 | * | 9/2001 | Wiklund | ................. B27B 1/005 144/345 |

(Continued)

FOREIGN PATENT DOCUMENTS

| | | | | |
|---|---|---|---|---|
| GB | 2344776 | * | 6/2000 | ............. A45D 29/00 |
| JP | 2000175732 | * | 6/2000 | ............. A45D 29/00 |

(Continued)

OTHER PUBLICATIONS

Google translation of KR 100701453, published on Mar. 2007 (Year: 2007).*

*Primary Examiner* — Huan H Tran
(74) *Attorney, Agent, or Firm* — Luis Figarella

(57) ABSTRACT

Electronic device for the automated painting and drying of fingernails, that allows the user to choose the color they want to paint the nails as well as to carry the device due to its light weight. In one embodiment, the device has a sensor that identifies the hand that has been introduced in it, a touch LED screen, which allows the user to choose the nail and color with which to paint it, without the need for specialized personnel to operate it, as well as to inform the user through visible and audible means the process taking place. In one embodiment, the unit contains capacitive and/or infrared sensors to locate and detect the difference of the surface of the finger and nail, a computer or processor which guides and controls the gimbaled paint head with the ink that carries the staining of the surface of the nail.

15 Claims, 15 Drawing Sheets

Related U.S. Application Data

(60) Provisional application No. 61/871,287, filed on Aug. 28, 2013.

(51) Int. Cl.
*G06F 3/041* (2006.01)
*G09G 3/32* (2016.01)

(56) References Cited

U.S. PATENT DOCUMENTS

| | | | | |
|---|---|---|---|---|
| 6,525,724 B1 * | 2/2003 | Takami | ............... | A45D 29/00 345/418 |
| 6,538,767 B1 * | 3/2003 | Over | ............... | B41J 3/4073 358/1.18 |
| 6,923,115 B1 * | 8/2005 | Litscher | ............... | B41F 17/30 101/35 |
| 8,681,359 B2 * | 3/2014 | Bitoh | ............... | A45D 29/00 132/73 |
| 2003/0161946 A1 * | 8/2003 | Moore | ............... | B05B 14/10 427/236 |
| 2005/0174367 A1 * | 8/2005 | Kondo | ............... | A45D 29/00 347/3 |
| 2011/0304877 A1 * | 12/2011 | Bitoh | ............... | A45D 29/00 358/1.15 |
| 2012/0301667 A1 * | 11/2012 | Ryabova | ............... | B05C 13/02 428/137 |
| 2012/0301671 A1 * | 11/2012 | Ryabova | ............... | B05C 13/02 428/141 |
| 2015/0335131 A1 * | 11/2015 | Ortiz | ............... | A45D 29/00 132/73.6 |
| 2016/0158786 A1 * | 6/2016 | Christensen | ............... | B05B 3/00 118/323 |

FOREIGN PATENT DOCUMENTS

| | | | | |
|---|---|---|---|---|
| JP | 2002165632 | * | 6/2002 | ............ A45D 29/00 |
| KR | 10-2004-0060776 | * | 7/2004 | ............ A45D 29/22 |

* cited by examiner

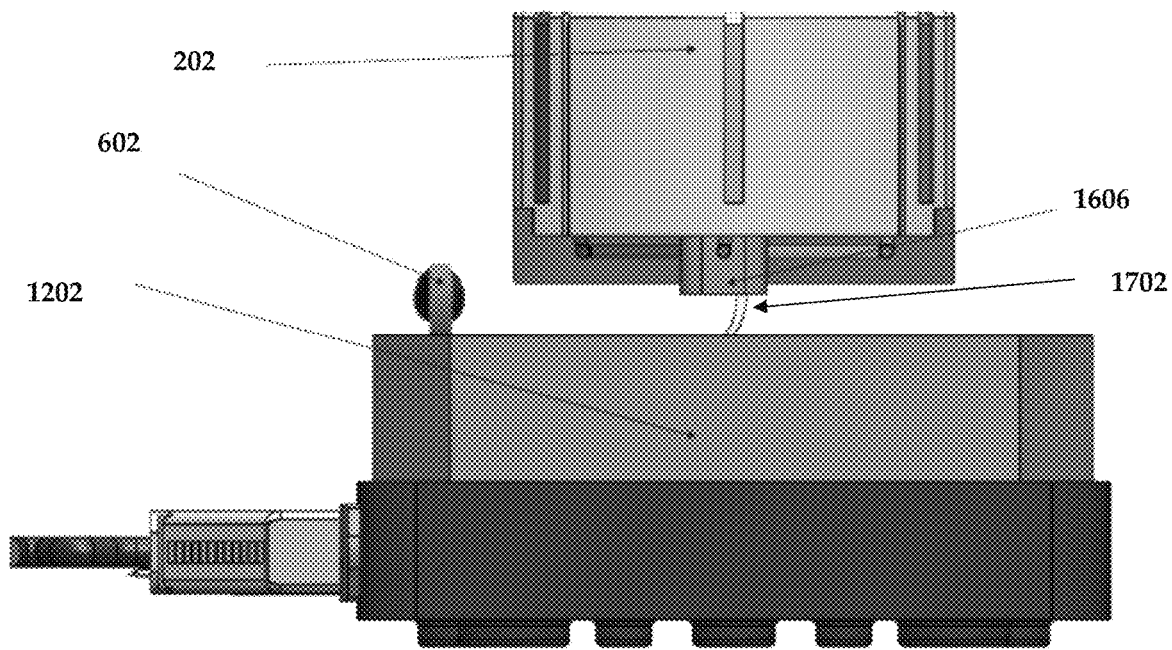
Figure 17
Figure 18
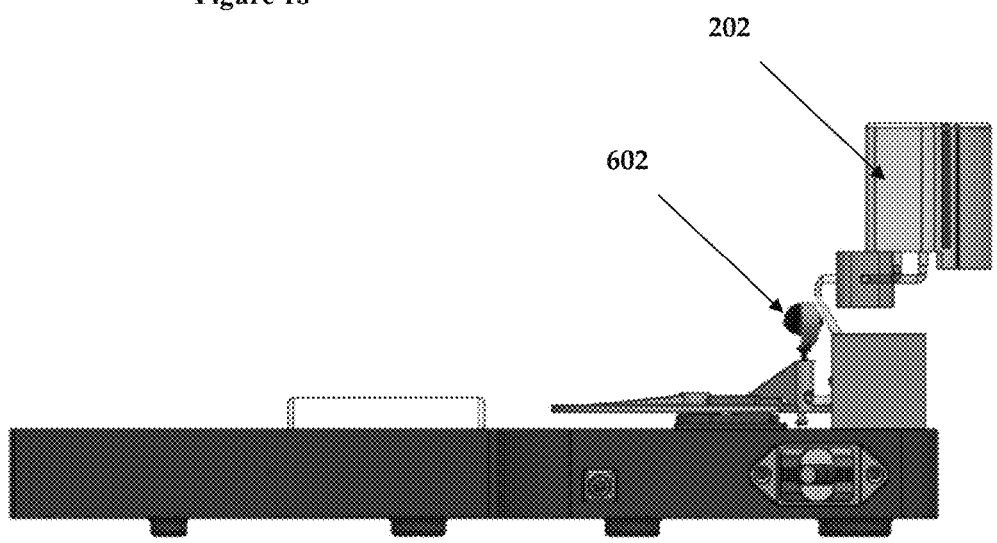

AUTOMATIC NAIL PAINTING MACHINE

CROSS-REFERENCE TO RELATED APPLICATIONS

This application is a continuation-in-part of pending U.S. patent application Ser. No. 14/375,378 titled "Automatic Nail Painting Machine" filed on Jun. 23, 2015, the disclosure of which is incorporated by reference in its entirety into this application.

PATENTS CITED

The following documents and references are incorporated by reference in their entirety; Jenkins et al (U.S. Pat. No. 5,302,224), Kondo et al (U.S. Pat. Pub. No. 2005/0174367), Watabe (JP 2007062062), Gerber (JP2000175732), Kondo (U.S. Pat. Pub. No. 2005/0174367), Weber (U.S. Pat. No. 6,286,517), Mombourquette (U.S. Pat. No. 6,035,860), Yoshiharu (JP 2008/287744), Bitoh (U.S. Pat. Pub. No. 2011/0304877), Anzures (U.S. Pat. Pub. No. 2011/0163969), Robinson (U.S. Pat. No. 7,712,473) and Plenty (KR20040060776).

FIELD OF THE INVENTION

This invention relates to the automated application of nail polish to fingernails, and specifically to the automated painting and drying of fingernails.

DESCRIPTION OF THE RELATED ART

The market has seen various proposals and solutions, as well as some inventions very different to those presented herein. The Japanese application for Gerber (JP2000175732) discloses a device for the automatic application of liquid nail polish which is provided with a camera having the image of the nail, a processor for analyzing the image and convert it into a tool locus for movement, and application means for applying the liquid nail polish along the tool moving locus.

The Japanese Patent to Watabe (JP 2007062062) describes a device designed to accurately draw a picture in a short time regardless of the complexity of the drawing. However, the device uses a default template that transfers the image to the nail, and a platform to transfer pattern printing plates prepared to a template fingernail.

The US patent application for Kondo (U.S. Appl. No. 2005174367) describes a nail painter capable of representing pictorial images with different contents on the nails using different colors of nail polish accurately during the short period of time without requiring the user to perform the expensive operation, and pollutes the device periphery. A key part of the apparatus shown consists of means for securing the fingertip, something bound to be objected by customers.

Korean application to Plenty (KR20040060776) describes an apparatus for quickly and accurately painting images of diverse content in nails with various nail polish colors without disturbing operations a user with relatively little staining of the periphery of the apparatus.

However, the above display significant disadvantages in comfort, peace of mind, portability and trust in their use by a third party. They are usually large (60 cm×90 cm×90 cm) and heavy weight (10-20 kg). They do not allow the user to choose the brand of nail polish (also called nail enamel) to use, the user must use the existing colors used by the device manufacturer. What is needed, is an easy to use device that is portable, can be trusted (particularly with one's nails!) and convenient to use by the users.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the invention is about an apparatus for the automated painting of human fingernails comprising a housing having two or more apertures, where each such aperture is suitable for the insertion of one or more human digits, including the thumbs, sensor components for sensing the position of a finger and its fingernail and components for applying nail polish on said fingernail surface, where said nail polish application components allow for the application of said polish in an orthogonal direction to said nail surface by positioning in three-dimensional space application components over said one or more fingernails. In another aspect, said components for applying nail polish or comprise a moving spray mechanism mounted on a turntable, so that said spray mechanism can be moved along the natural arch formed by the human finger ends and said spray mechanism has one or more spray nozzles whose spray axis can be adjusted in three directions (X, Y, Z), as well as movable along one or more arcs, so that the spray may be orthogonal to the nail surface. In yet another aspect, said sensor components includes an infrared sensor.

In another aspect, said sensor components includes a capacitive sensor. In yet another aspect, said moving mechanism includes a gimbaled spray mechanism so as to keep nail polish application component orthogonal to the nail surface. In another aspect, said housing has six or more openings, with two of those openings suitable for the insertion of a human thumb, said apparatus further comprises indicators of the operating status of the unit.

In one aspect, the invention is about an enclosure housing the unit, said enclosure comprising an LED touch screen for graphically showing the hand which has been introduced, an ergonomic base to place the hand, wrist and forearm, one or more openings for the placement of nail polish dispensing containers, said containers identifying said nail polish's color, electrical cable connectors, speaker, and access to air outside said enclosure and two or more openings for the insertion of human fingers, a sensor for detecting the position of a finger and the position of the nail within said finger and nail painting mechanism mounted on a turntable and capable of applying nail polish in an orthogonal direction to said nail surface and of adjusting the position of said nail polish applicator in three directions (X, Y, Z) as well as movable along said turntable arc in reference to said nail surface.

In another aspect, said enclosure has six finger openings, each opening having a channel, so that the five from one side and the five from the other side form the shape of a human hand and said nail painting mechanism is comprised of a painting nozzle, with a nozzle distance to nail adjustable between 0.1 mm to 75 mm. In yet another aspect, said nail painting mechanism is comprised of both capacitive sensors and infrared sensors said nail painting system is comprised of one or more motors, one or more nozzles, one or more tubes, one or more compressors, one or more pneumatic valves for painting, an air issuing device, gears, and a UV lamp for drying nail polish and lacquer finish. In another aspect, one or more of said nail polish dispensing containers connects to the device and provides access to the nail polish glaze so that when moved through a channel said glaze passes to the injector and/or applicator. In yet another aspect, said dispenser system allows the identification of the color of nail polish, date of last use and the remaining amount in the same.

In another aspect, said LED touch screen shows graphically the hand in place, points the fingers and numbers them from 1 to 5, colors that are available in the dispenser, the level of remaining glaze and the last date of use. In yet another aspect, said enclosure comprises a speaker. In another aspect, said enclosure has an air opening, which allows for cross ventilation through the help of an internal fan. In another aspect, the enclosure includes a Bluetooth or USB port that allows users to download songs to play while the device performs the nail polish.

In one aspect, the invention is about a housing having two or more apertures, where such apertures are suitable for insertion of one or more human digits, including the thumb, sensor means for sensing the position of a finger and your fingernail, means of applying nail polish or nail polish and said means to position in three-dimensional space and through said drying nail polish paint or said one or more nails. In another aspect this means for applying nail polish or nail polish comprises a moving spray mechanism. In another aspect, said sensor means includes an infrared sensor.

In one aspect, said sensor means includes a capacitive sensor. In another aspect, said moving mechanism includes a gimbaled spray mechanism. In one aspect, said housing has six or more openings, with two of those openings suitable for the insertion of a human thumb. In another aspect further comprises indicators of the operating status of the unit.

Other features and advantages of the present invention will become apparent upon examining the following detailed description of an embodiment thereof, taken in conjunction with the attached drawings.

BRIEF DESCRIPTION OF THE DRAWINGS

FIG. 17 shows a side view of the system components, according to an illustrative embodiment of the invention.

FIG. 18 shows another side view of the device components, according to an illustrative embodiment of the invention.

Figure 1:
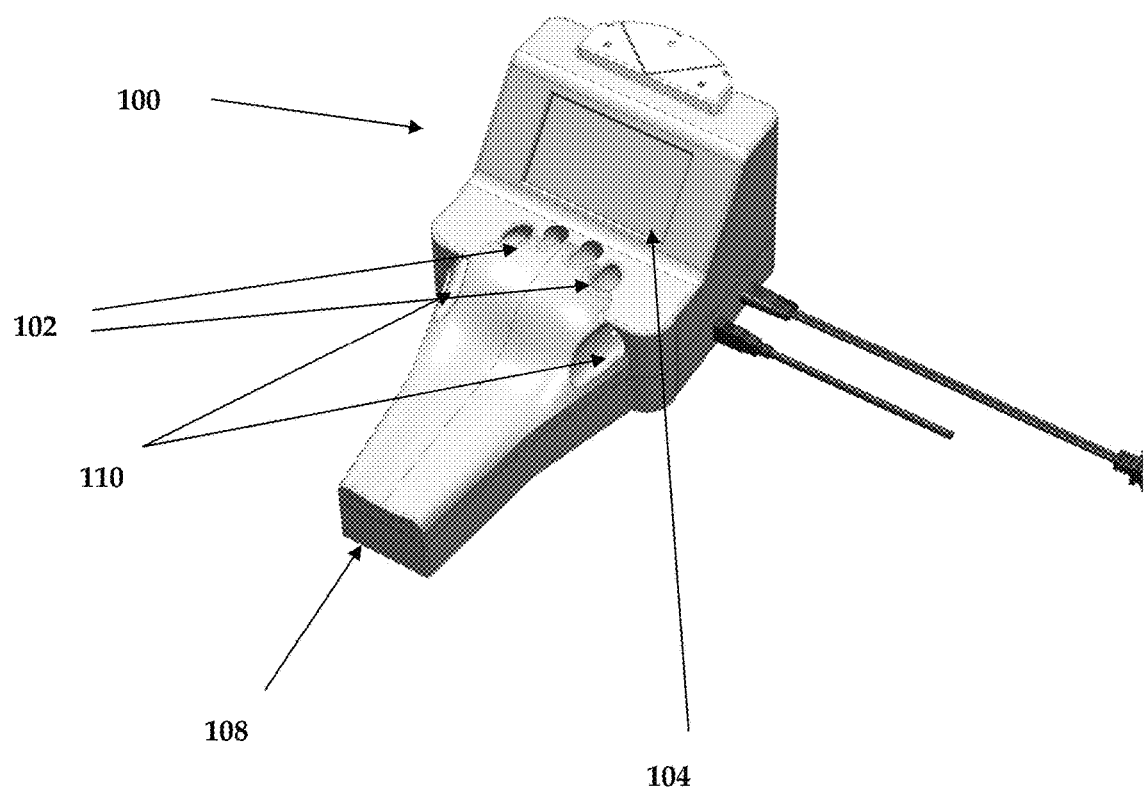
FIG. 1 shows a top view of three-dimensional shape of the exterior of the electronic device automated painting and drying of the fingernails, include the LED screen, the apertures of the fingers, electrical lines, the container of nail polish, and the rest of the forearm, according to an illustrative embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some embodiments, bodies, and preferred implementations modifications. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure.

The compositions, apparatuses, systems and/or methods described herein may be adapted and modified as is appropriate for the application being addressed and that those described herein may be employed in other suitable applications, and that such other additions and modifications will not depart from the scope hereof.

As used in the specification and claims, the singular forms "a," "an" and "the" include plural referents unless the context clearly indicates otherwise. For example, the term "transaction" may include a plurality of transaction, unless the context clearly dictates otherwise. As used in the specification and claims, the singular names or reference include variations within the family of that name, unless the context clearly dictates otherwise.

Certain terminology is used in the following description for convenience only and is not limiting. The words "low," "down," over "," top "," front "," back "," left "," right "and" parts "designate directions in the drawings to which reference is made, but they are not limiting with respect to the orientation in which the modules can be used for mounting or any of them.

All references, including any patents or patent applications cited herein are incorporated herein by reference. No admission is made that any reference constitutes prior art. The discussion of the references states what their authors assert, and applicants the right to challenge the accuracy and relevance of the documents cited are reserved. It is clearly understood that, although reference in this document are a number of prior art publications is done, this reference does not constitute an admission that any of these documents are part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1 we see an embodiment of the electronic device 100 for the automated painting and drying polish of nails. This device has been designed to paint and dry nails automatically in the shortest time possible. The invention consists of two objects: the internal functionality of the device and the exterior and interior design of it, without which we could not reach the solution to the problem.

In a preferred form of use, the user either activates the machine via an ON/OFF button, or when they place the hand in the device a sensor detects the hand and activates the unit. Either way, the user inserts one or more fingers of a hand into one or more openings 102, which allows a computer to recognize which hand is inserted (preferably noting the position of the thumb on one of the two openings 110 using thumb (FIGS. 6-9) one or more sensors 610 fingers). A see the hand is detected, the head unit 602 moves along the periphery of the hand, using one or more sensors mounted on one or more areas 606 of head unit 602 to detect the position of each nail.

To determine the position of the digit, in one embodiment a combination of means, resources or ways to detect the digit, position and position of the area of the nail, which may include capacitive, infrared sensors are used. Alternate embodiments may also use detectors colors, visual cameras, etc., Vision systems ("machine vision") with filters and/or illumination capable of detecting and delineating the nail area vis-à-vis the cuticle and finger.

In one embodiment, the head 602 is moved to the area where it is expected that the distal area of the finger or digit, and determines its location using a capacitive sensor mounted on the sensory area 606. So the nail is detected, allowing recognize the presence of the nail, preventing the system is activated by introducing object other than the one specified in the design.

In one embodiment, a capacitive sensor, which delivers different voltages according to the object which is already close to the distance that is used for this. This information allows you to adjust the sensor to detect a person's claw and enable the system begins to operate only with the presence of a human finger. This also contributes to the added accuracy when painted provide vital information in conjunction with an infrared sensor also mounted on one or more areas 606 of sensor head 602.

Using this information, particularly through the difference between the detected surface capacitive sensor and/or infrared, allows the processor 802 of the system to understand the specific location of the perimeter of the surface of the nail. That is, the spatial point of change between the surface of the nail and finger (both the cuticle and the same finger). This abrupt change in the characteristic of the surface delimiting the end of the nail and the start of the cuticle or the edge of the finger and the periphery of this.

With this information, the processor unit can send signals to where to aim the applicator, so how and when to start and/or stop painting, controlling the various means/components, resources or manner of painting, which may include spray, spray, brush, applicator once or injector 608 to the surface of the nail. Providing this signal to said processor, the sensor providing the information required for controlling the motors and actuators of various means or ways of moving resources precise locations of the applicator. These means are the measure by which the applicator 608 used to paint the surface of the nail moves.

With the spatial information detected by sensors, and set in a 'real time' (to adjust any changes induced restlessness, nervousness or other movement of the user), the applicator 608 moves nail by nail to paint or register any graphic design on it.

Figure 10:
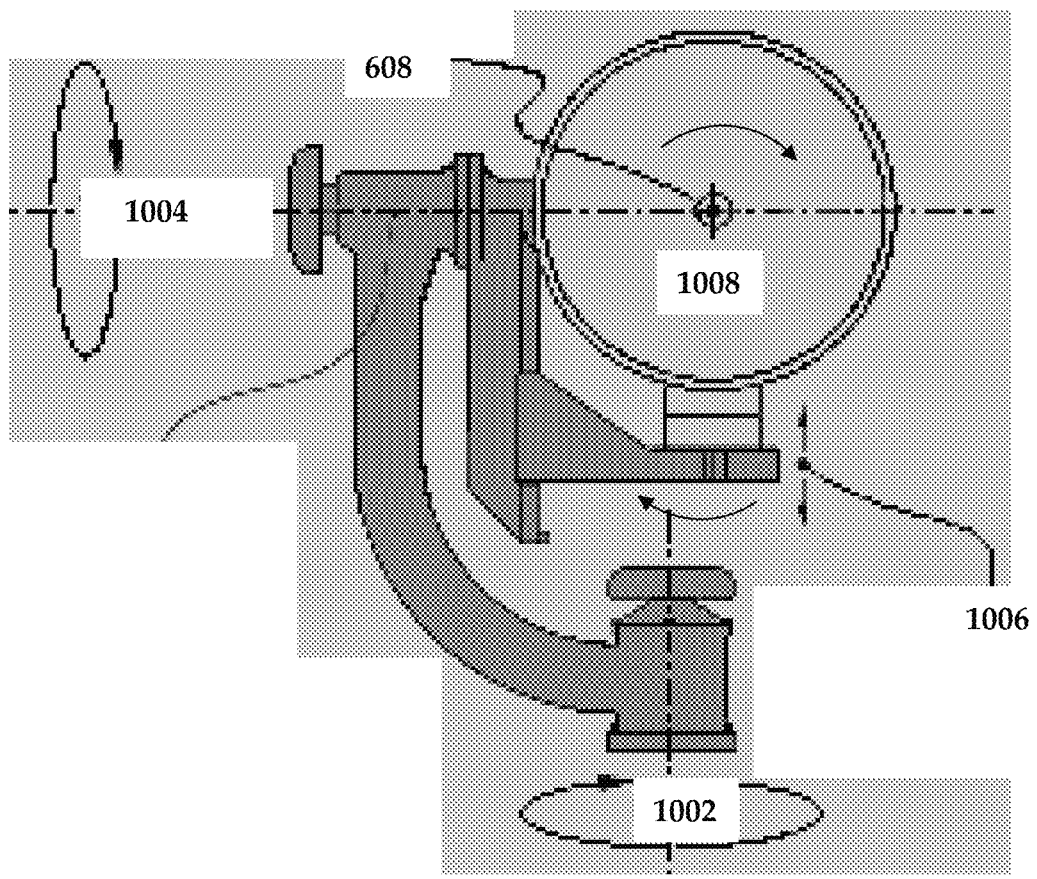
FIG. 10 shows an illustration of a "gimball" comprising the heart of the gimbaled applicator system, according to an illustrative embodiment of the invention.
Figure 11:
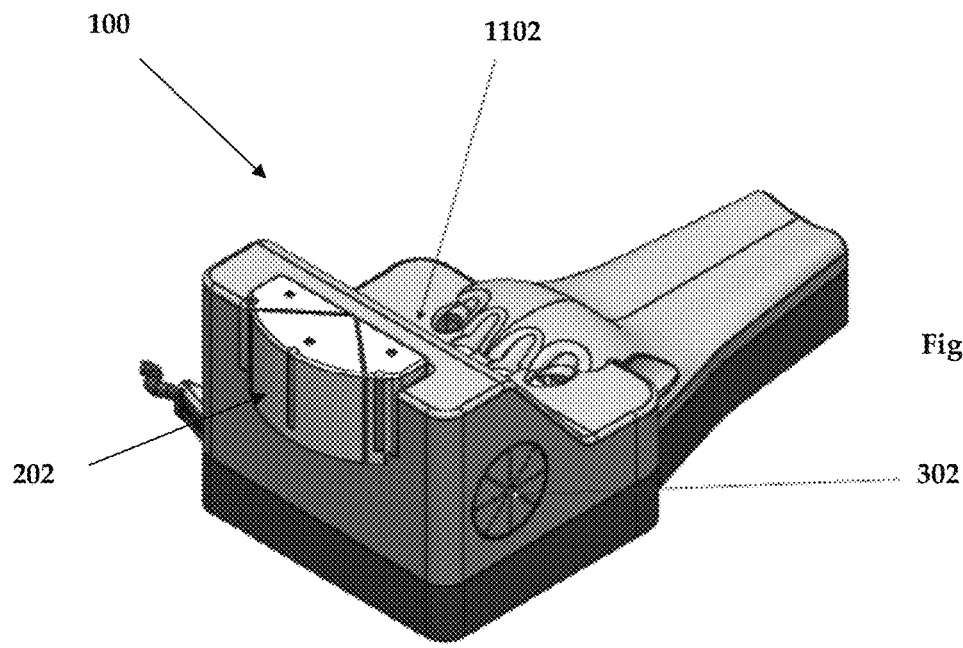
FIG. 11 shows a three-dimensional perspective view of the outside of the device, showing the container of nail polish, according to an illustrative embodiment of the invention.
Figure 12:
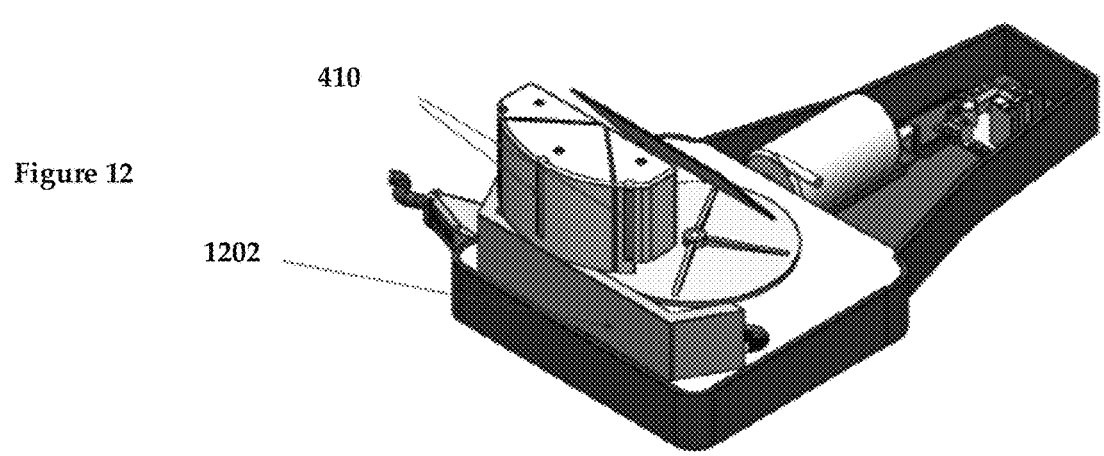
FIG. 12 shows a three-dimensional perspective view of the internals of the device with the cover removed but showing the container of nail polish, according to an illustrative embodiment of the invention.
Figure 13:
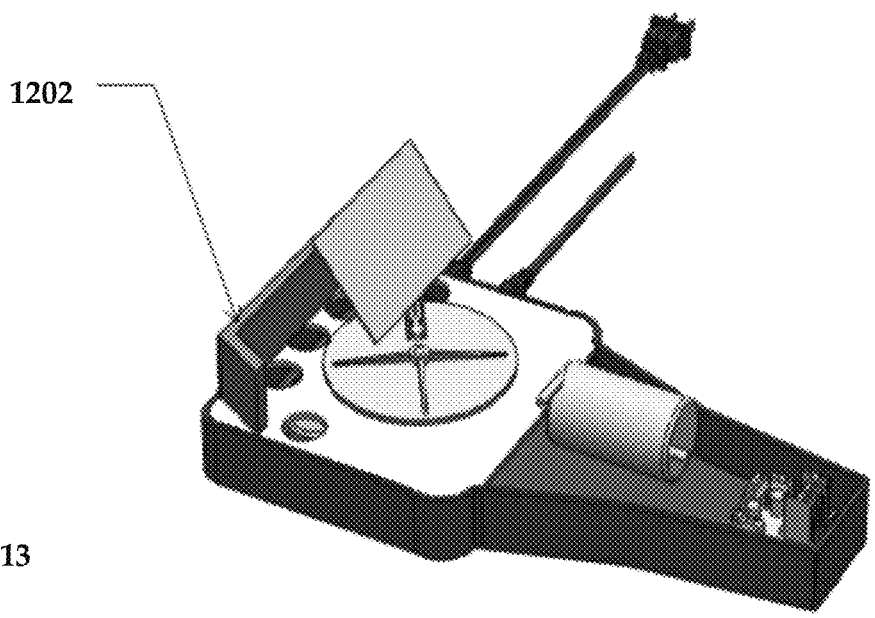
FIG. 13 shows a three-dimensional perspective view of the bottom components of the device, according to an illustrative embodiment of the invention.
Figure 14:
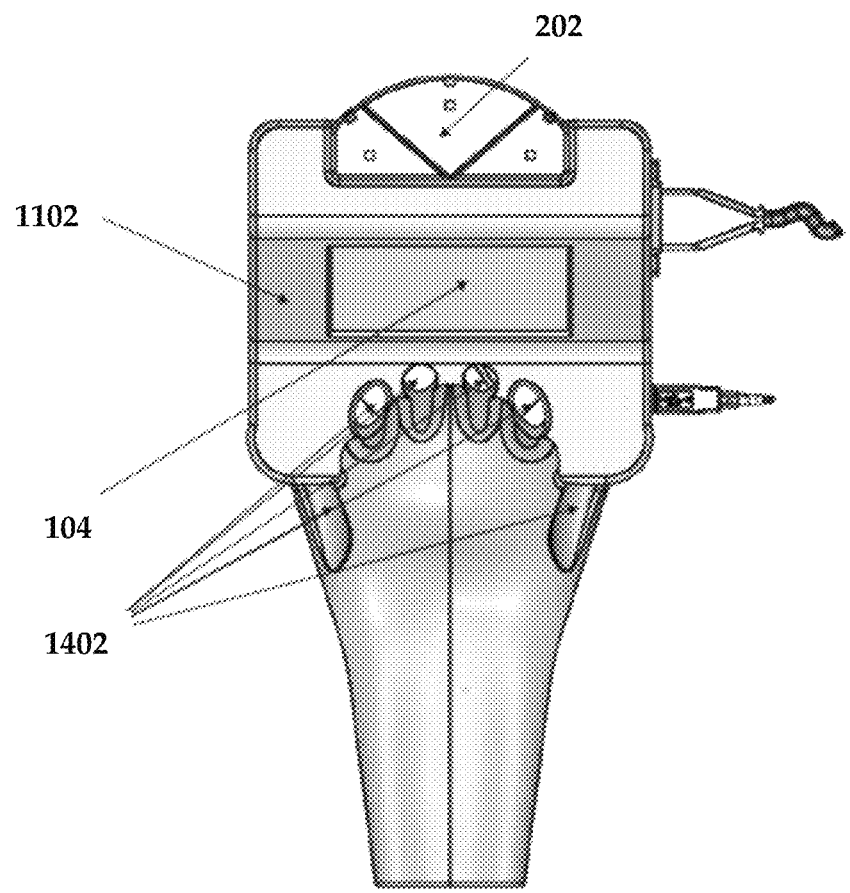
FIG. 14 shows a top view of the device, according to an illustrative embodiment of the invention.
Figures 15, 16:
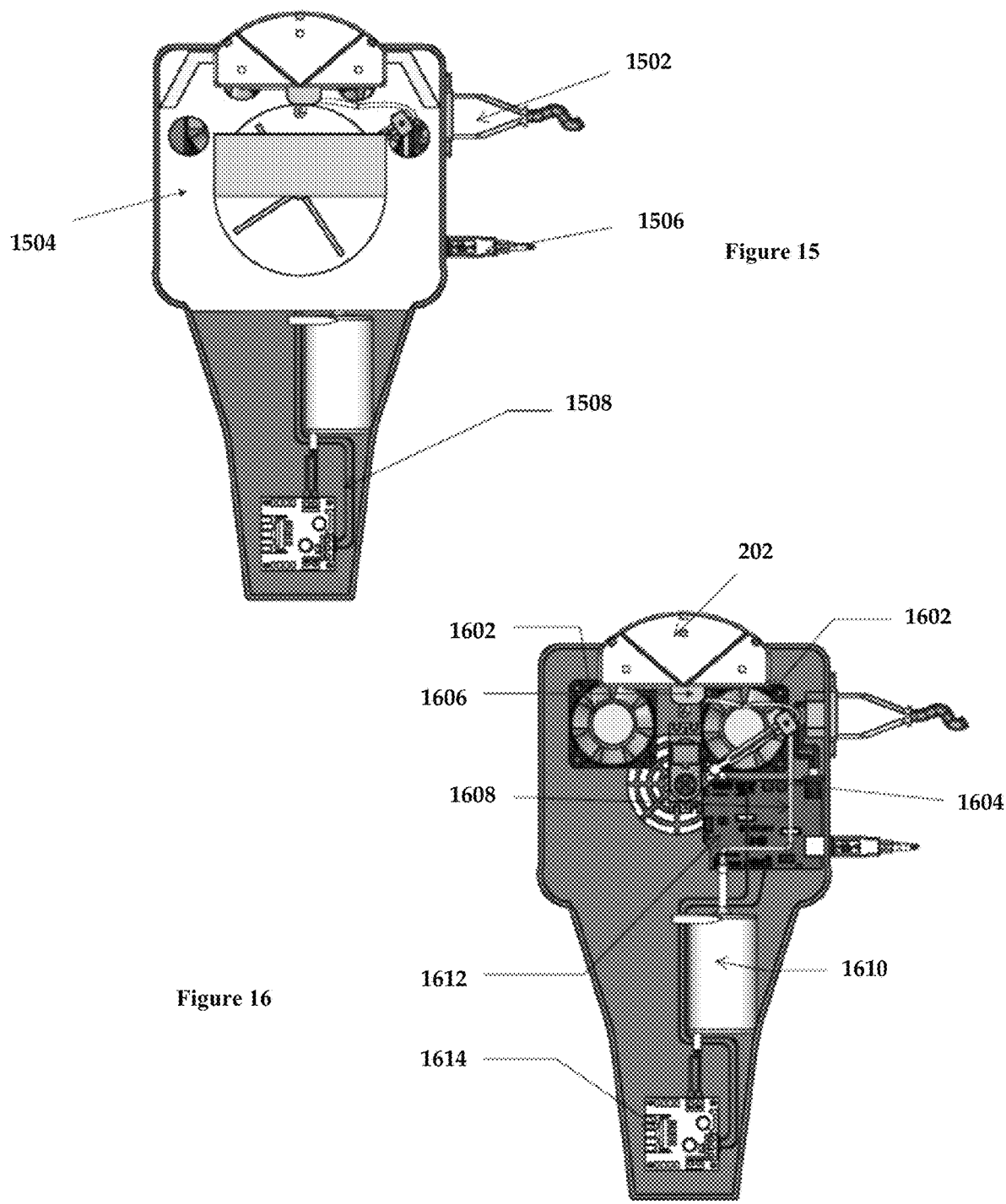
FIG. 15 shows a top view of the device, with the top cover removed, according to an illustrative embodiment of the invention.
FIG. 16 shows a top view of the device bottom portion, according to an illustrative embodiment of the invention.
Figure 19:
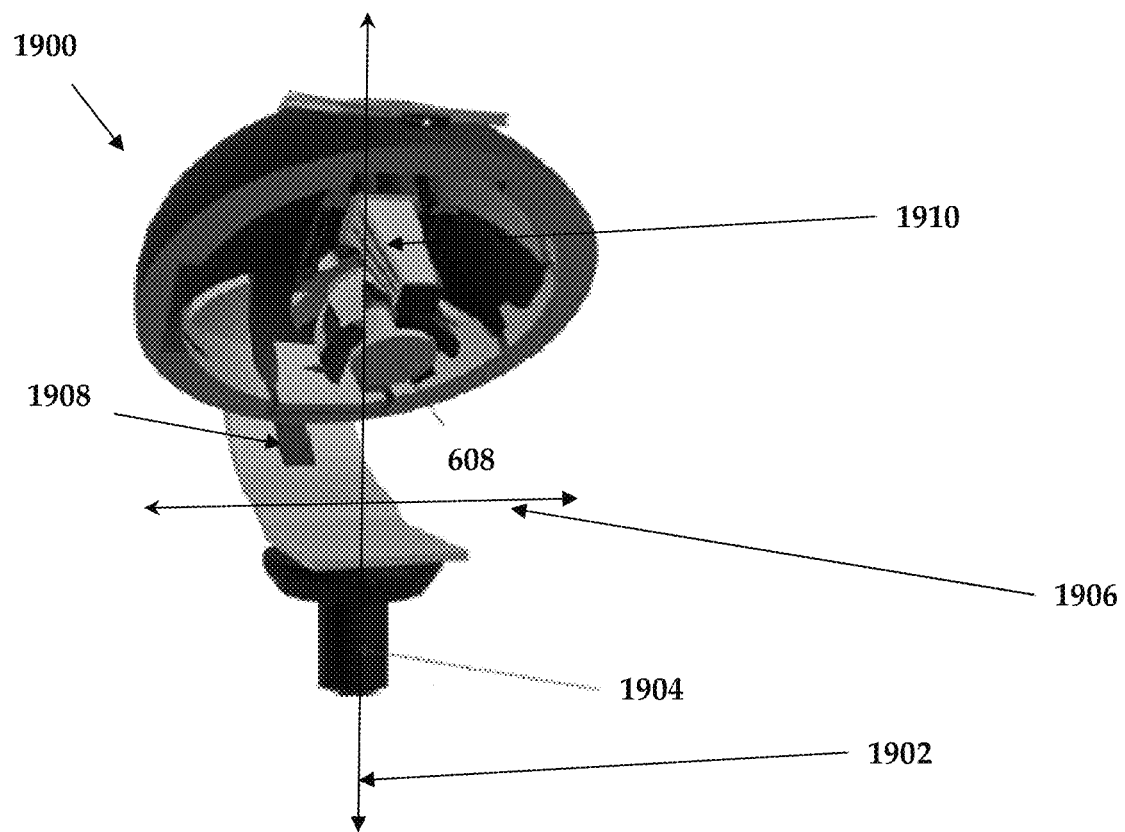
FIG. 19 shows a perspective view of the gimbaled single painting nozzle assembly, according to an illustrative embodiment of the invention.
Figure 20:
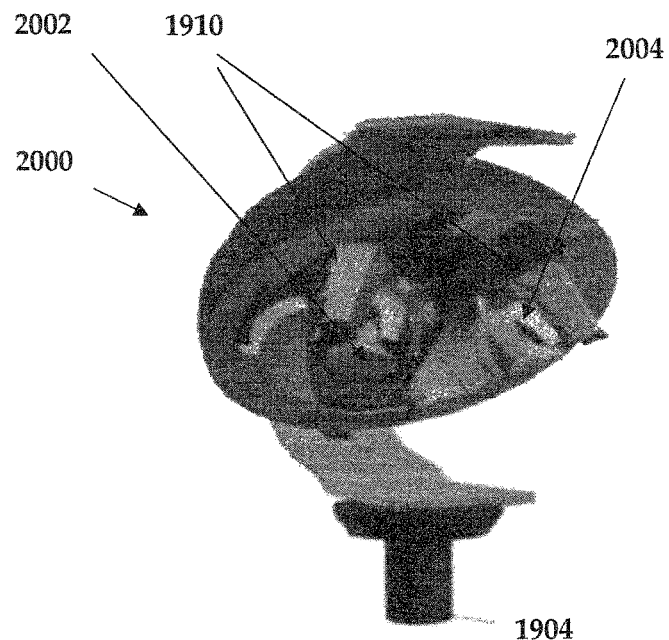
FIG. 20 shows a top view of the gimbaled double painting nozzle assembly, according to an illustrative embodiment of the invention.
Figure 21:
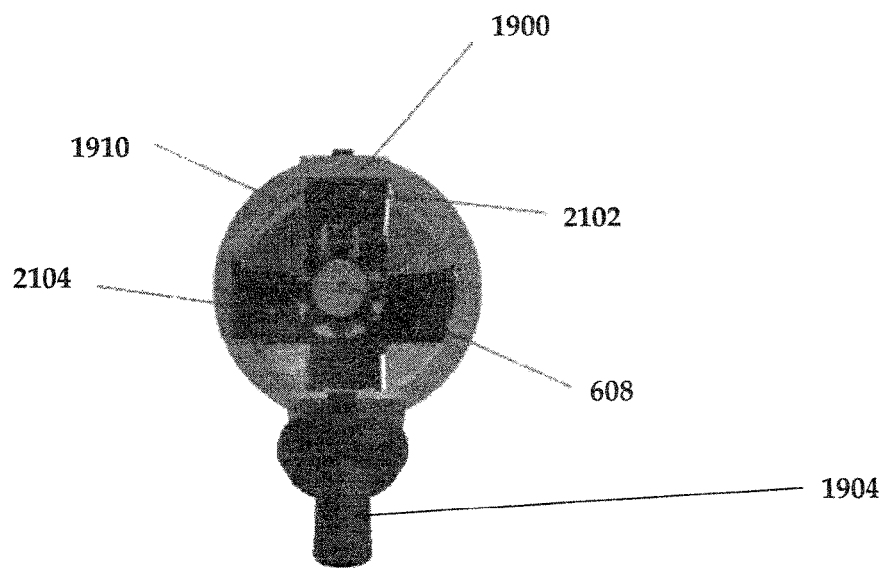
FIG. 21 shows a front view of the gimbaled single painting nozzle assembly, according to an illustrative embodiment of the invention.
Figure 22:
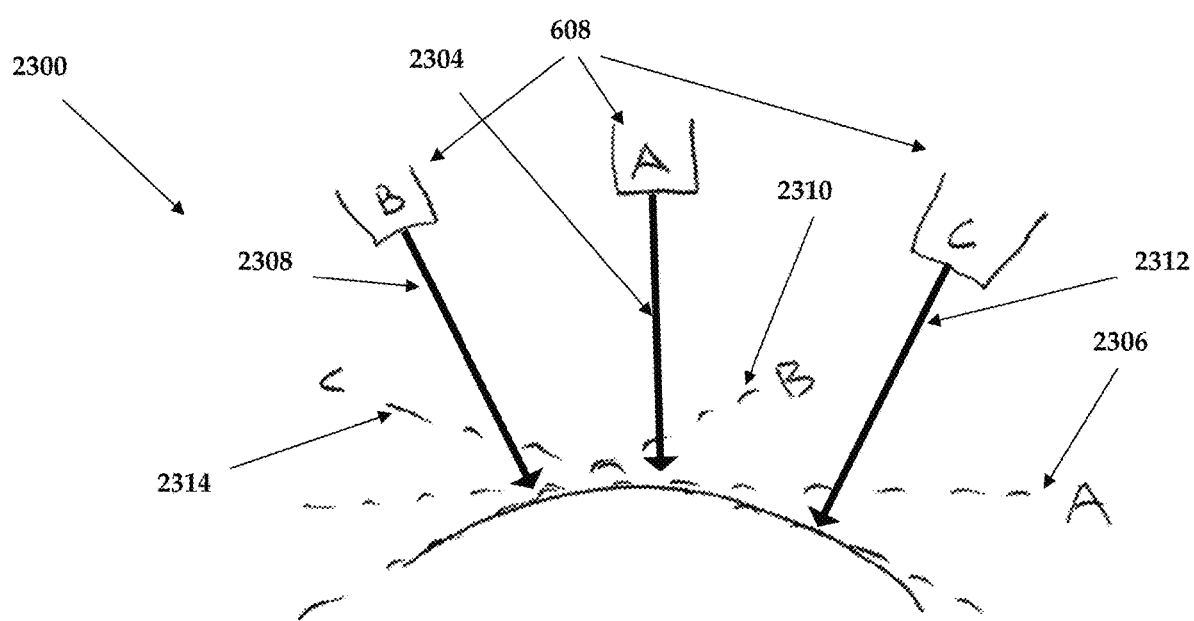
FIG. 22 shows the ability of the gimbaled assembly to remain orthogonal to the nail surface, according to an illustrative embodiment of the invention.

In one embodiment, the applicator 608 is mounted on a gimbaled movable head 602 to the full width of the user's hand, said head gimbaled device also containing a (FIG. 10) that allows the applicator to be moved in three planes or positions X, Y, Z. X 1002 or longer, from the cuticle to the end of the nail. And wide or 1004, from the left end to the right. 1006 Z or depth that allows both the offset approach, withdrawal) and optionally the rotation angle of the applicator 1008 to the surface 606 of the nail. The information given by the sensor will be sent to a processor which has the angles of the location where the fingers are.

The fingers enter the device through channels or openings which will take you to the desired location to be detected and identified its dimensions. This manages to locate the nail polish or other paint evenly across the entire surface of the nail according to the size, curvature and length of each type of nail, allowing the application to be orthogonal to the surface of the nail, or in any other desired angle. As an example, when this near the cuticle, is desirable angular applicator 608 into the painted area, minimizing any splashed or overspray.

The infrared sensor in combination with capacitive provides accuracy when starting the painting process, the sensor has pinpoint accuracy allowing to determine the physical limits of the nail, creating a temporary map to the device is capable of performing the painting process in a quick and precise manner. At the end of drying equipment shall repeat the process but now with the protective lacquer for the nails. All these steps are displayed by LED touch "touch screen" display showing each step and is also where the user controls what color you want to paint each nail.

Figure 2:
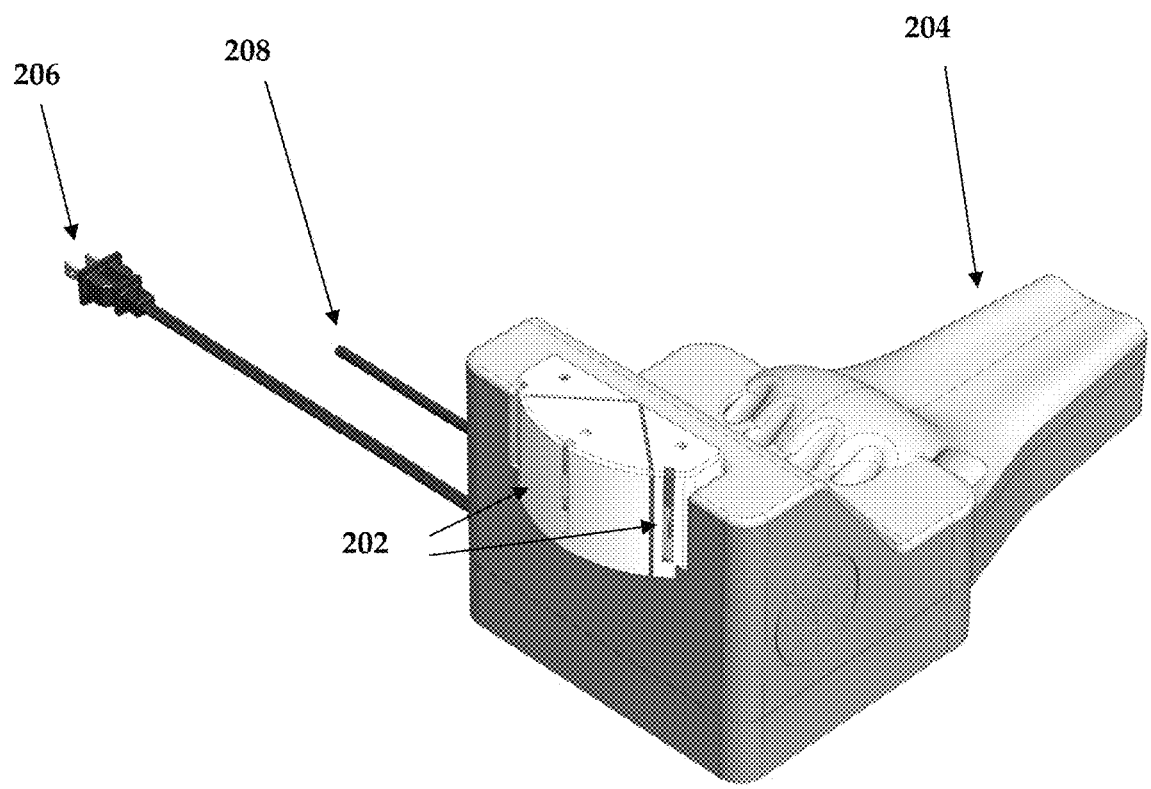
FIG. 2 shows a three-dimensional view of the front of the device, showing the container of nail polish and electric wires and the rest of the forearm, according to an illustrative embodiment of the invention.
Figure 3:
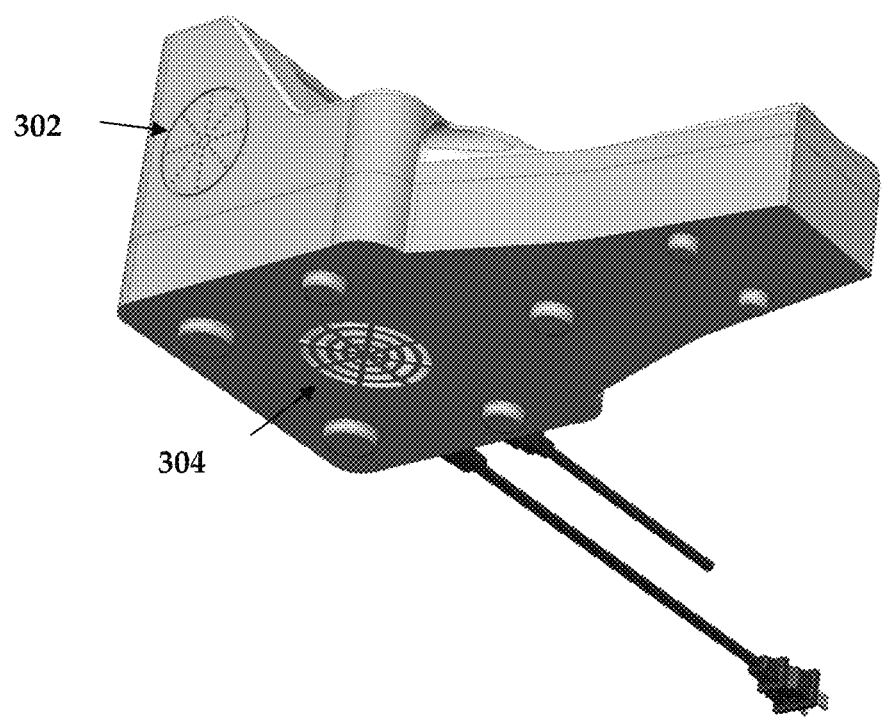
FIG. 3 shows a three-dimensional view of the outside bottom of the device, showing the speaker side and the air inlet at the bottom of the device, according to an illustrative embodiment of the invention.

The system can be programmed by the user via the display 104, for a remote application on another computer, tablet, Smartphone or cell unit. In one embodiment, the system is programmed to paint all fingers at the same time, with the same color, in alternate embodiments, various colors and graphic designs are scheduled in advance by the user. The unit (FIGS. 2-3) can be operated by batteries 108, AC voltage 206, DC voltage 208 (either USB or a car DC outlet).

In one embodiment, after the applicator 606 has completed the painting, the processor will send a signal to the drying system to fix the nail paint or nail polish to the nail. This drying system can be as simple as only air (operated by a fan located near the air inlet 304 with the air coming out of the peripheral input finger 102 and/or 110, the area of the speaker/announcer 302), or in other locations. In another embodiment, the system comprises a drying device issuing air into nails and a beam of ultraviolet light for drying nail polish in the shortest time possible. In yet another embodiment, a UV-light is used to dry the nail polish.

The ink, nail polish, enamel or other liquid or gas required to paint the nails is stored in one or more containers, dispensers, receptacles or containers 202, each said unit showing the fluid level indicator 410 that feed the applicator 608 in the supply of the nail polish according to the required demand. This storage device has a capacity or level sensor to warn the system and the user when the container is running low audible and visual way through lights, indicators, speakers 302 and/or display 104 (the LCD screen can be, LED or similar) device and any application linked to the device via USB, Wi-Fi, Ethernet, Bluetooth or similar technology.

Referring to FIGS. 11-16 we see the unit 100 having an external housing 1102, showing the speaker/announcement components 302 (be they speakers, beepers, etc.), the nail polish package(s) 202, with the individual level 410, Ultraviolet lamp 1202, opening/apertures 1402 for fingers and thumbs.

In one embodiment we see the unit's electric port 1502, protective plate 1504, USB port 1506, and electric cable 1508 distributing power within the unit. One or more internal fans 1602 distribute any heat and/or fumes within the housing helping diffuse said heat/fumes safely to the exterior of the housing. One or more gears 1604 move the applicator along a natural curve path that mimics the arch formed by the extension of the hand, travelling from pinkie to thumb and vice-versa.

In one embodiment, the nail polish/fluid is sprayed through a pneumatic setup, well known in the art by all those that have used a spray gun. One or more pneumatic valves 1606, control the output of a system of compressor pipes 1608 that travel between the gimball spray mechanism nozzle or head unit 602 and the compressor 1610. The actual control of the unit may be distributed along one or more electronic component housing units (1612, 1614).

Thus we see how the dispenser 202, feeds the appropriate nail polish via a multi-way pneumatic valve 1606 which under the control of the on-board electronics decides which color to feed the applicator/sprayer 608 mounted on the gimbaled head assembly 602.

In one embodiment, the gimbaled spray assembly 602 is comprised of a single sprayer 1900 unit having a single spray component 608. The gimbaled sprayer 608 can be controlled in three (3) Degrees of Freedom (DOF) based on the axes X 1902, Y 1906 and Z axes (rotation along X), through movement in the vertical arc rail 2102, the horizontal arc rail 2104 Additional DOF may be accomplished by displacing the single nozzle gimbaled assembly 1900 along the base 1904 and/or the rail 1908. All of these may be simply accomplished any electric micro-stepper, stepper and/or servo motor. In addition, since the unit already has a compressor 1610 pneumatic or hydraulic control of the gimball assembly 602 may be used. The detection of the nail may be accomplished by any suitable capacitive or thermal sensor 1910.

In another embodiment, a dual spraying head 2000 unit may be used. In such an arrangement, a first sprayer/applicator 2002 (as describe before 608, with or without it's own nail position sensor 1910) covering a first hemisphere or portion of nail polish application, and a second 2004 one covering the other. Note this arrangement may be used as faster (with one or both simultaneously operating certain spray angles in the nail), or with separate feeding tubes to each application from the valve, so that 'voiding'/clearing of the line may not be required when the application requires two colors (such as during a French manicure). Or simply as a way to continue working when one fails. Of course, dual color paths could be accomplished through dual tubing 1702 from the valve, and/or dual valves 1606 from the nail polish supply dispenser(s) 202.

The extreme value of the gimbaled assembly can be appreciated when we look at the unique requirements of painting fingernails. When you observe a human do it, it is quickly evident that they use their hand/wrist to ensure the nail polish applicator remains orthogonal to the surface of the nail, itself a significantly complex curve surface. A great polish, will optimally come from an applicator that is orthogonal to the surface of the nail. When we look 2300 at the nail 2302 curving surface, that will require the adjustment of the application nozzle 608 which may be further explaining to its position in space A, B, C. When in position A, the nozzle stream 2304 would arrive orthogonal to the flat projection of the nail portion being sprayed on 2306. However note that when the portion B of the nail must be painted, the optimal approach is to rotate the nozzle 608, so that the stream 2308 remains orthogonal to the parallel projection of the surface point 2310, and finally when doing the point C, the stream 2312 remains orthogonal to the point's parallel projection 2314.

Figure 4A:
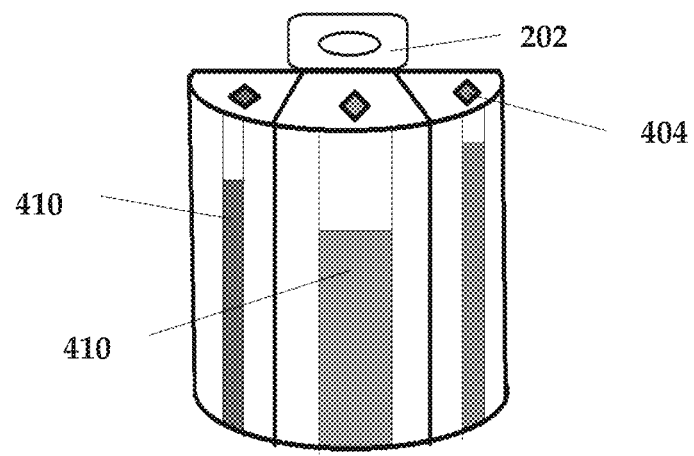
FIGS. 4A-4B show perspective and top views (respectively) of the nail polish container, according to illustrative embodiments of the invention.
Figure 4B:
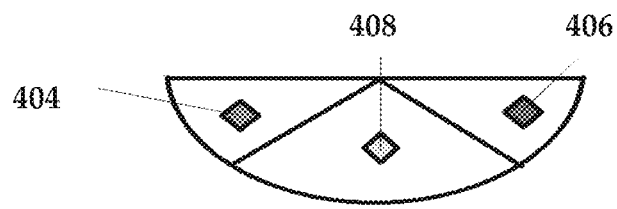

In one embodiment (FIGS. 4A-4B), each package 404, 406, 408 has a code that will be identified by the computer to determine the authenticity of the container and confirm that it has not been used previously and no been altered or container or paint to prevent equipment damage by re-painting of the same or other brand not recognized. After reading the code, the device may refuse the use of this container if it is not genuine or has been used previously.

This code may be a bar code, "Near Field Communication" (NFC), RFID, reading human, or the like. Each nail polish cartridge or dispenser will bring your utilization code. In one embodiment, the code will be typed on the screen when the dispenser is new. When the new dispenser is inserted the equipment, ask for the key that will bring the dispenser inside the box to ensure the originality of it.

In one embodiment, if the client last long with nail polish unused equipment detected based on elapsed time, if the paint is in good condition for use. Eventually glazes tend to change their density by the time of manufacture. The device measured the density will determine whether the nail polish is not able to be used. The device will tell and show the client the message: 'Change the Package XXX' in the case that the quality of the nail polish has been compromised.

Figure 5:
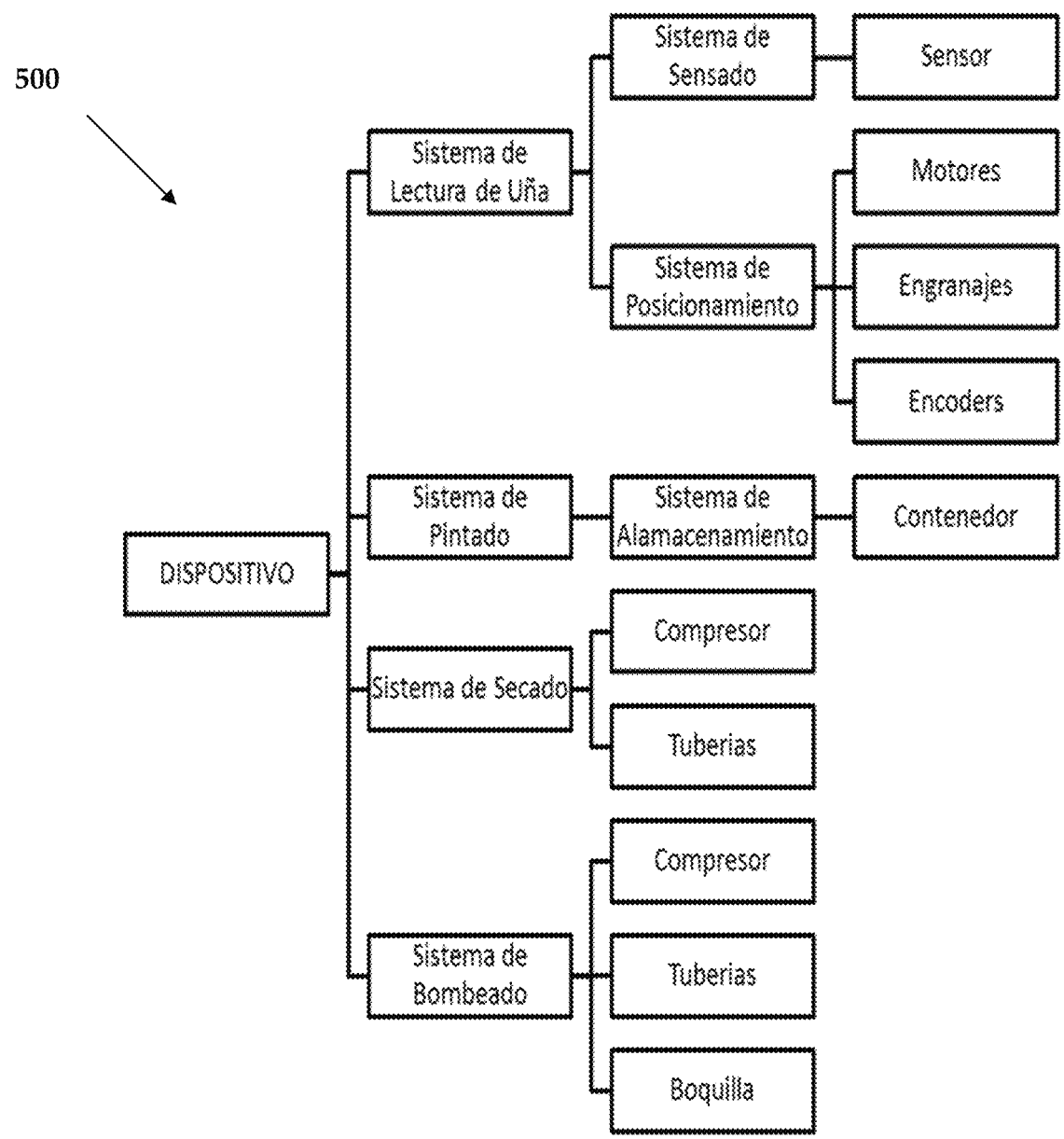
FIG. 5 shows the diagram of the electronic components forming the automated device of nails painting and drying, according to an illustrative embodiment of the invention.
Figure 6:
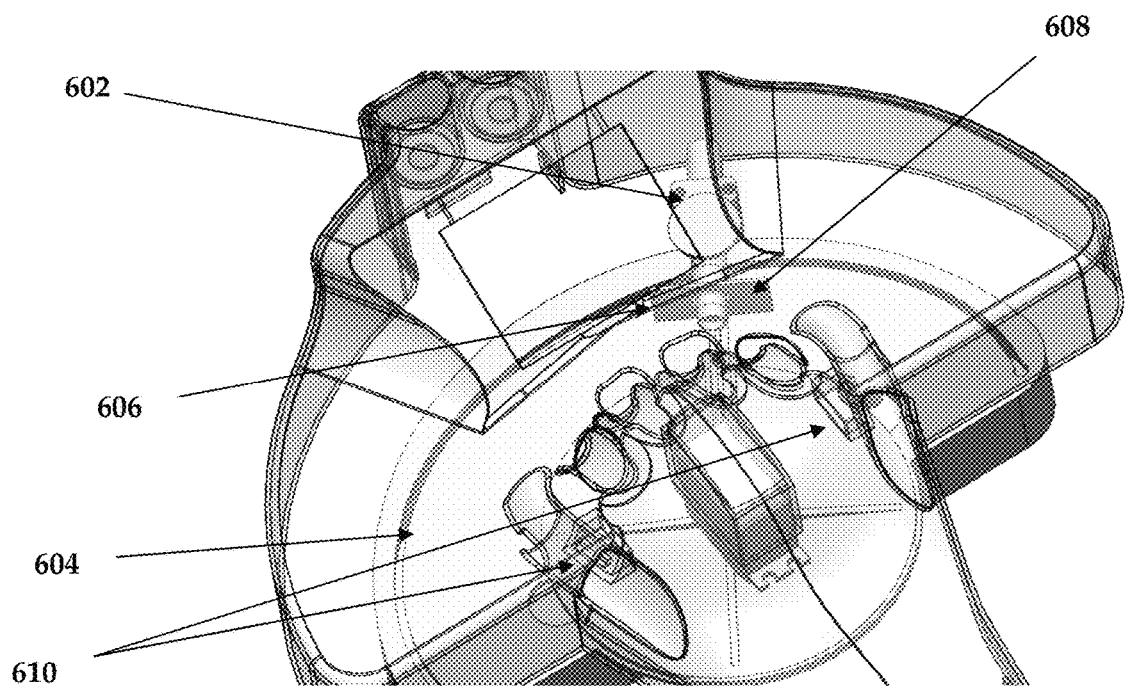
FIGS. 6-8 show three-dimensional views of the inside of the device, according to illustrative embodiments of the invention.
Figure 7:
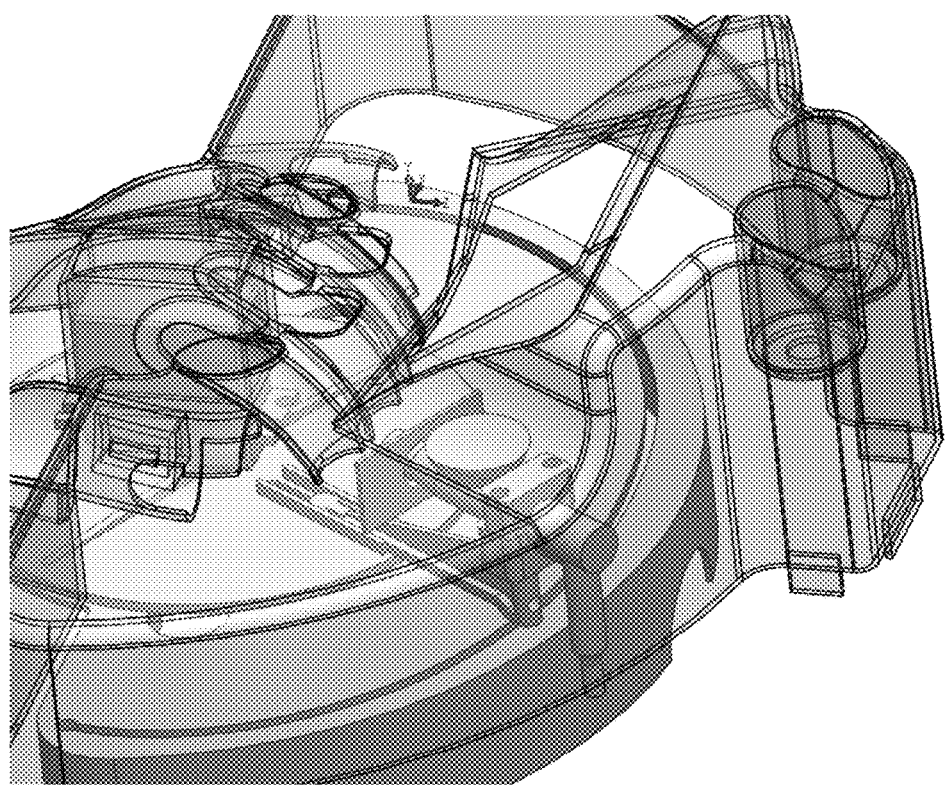
Figure 8:
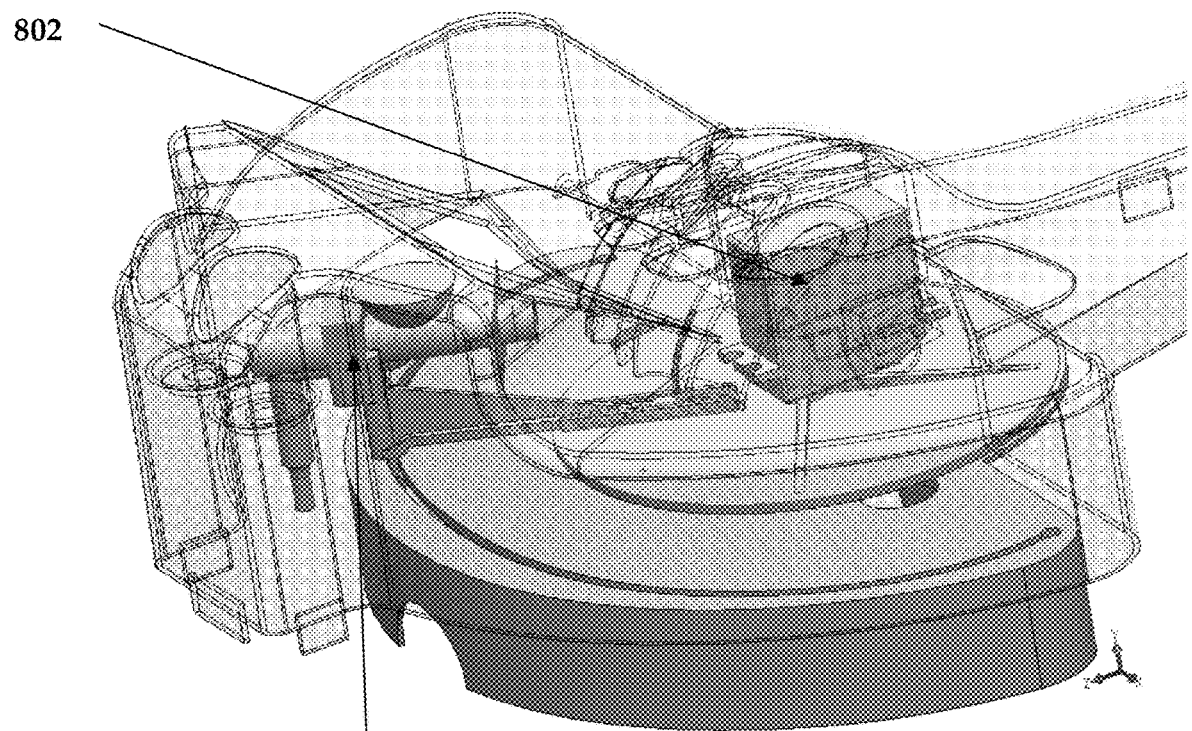
Figure 9:
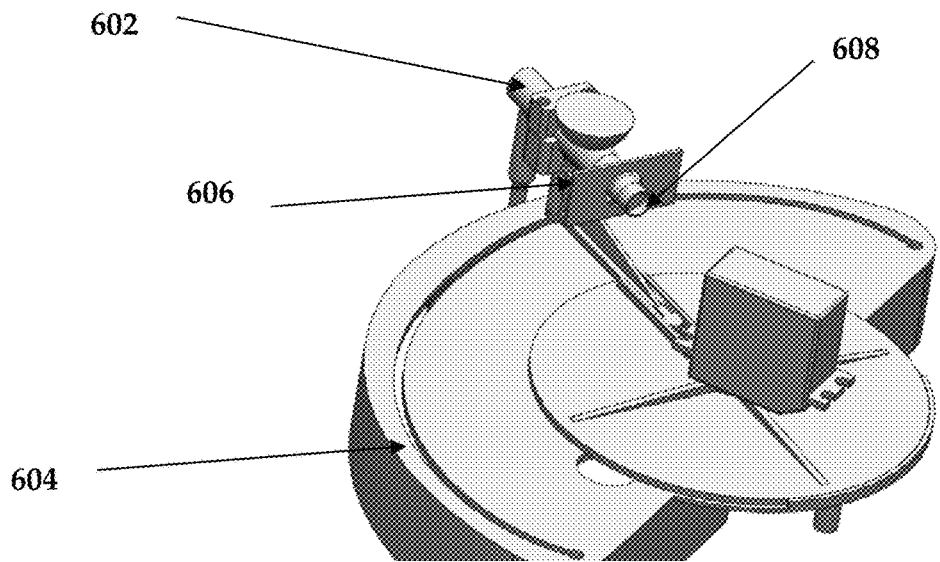
FIG. 9 shows the diagram of the components that comprise an option for automated electronic device nails painting and drying, according to an illustrative embodiment of the invention.

The system is controlled by a processor and memory (FIG. 5), able to be linked with the various sensors described above. This microprocessor uses electronics to control the various functions 500 and processes required to operate the system as described above.

Once the process with one hand has finished, the device prompts audibly and visually, the user inserts the other hand to repeat the process. In one embodiment, the computer shuts down after 2 minutes without any use or function being performed, to save energy use.

Examples

In an example, show one embodiment of an electronic device automated painting and drying of nails, comprising at least two openings for the fingers, at least one opening to place dispenser nail polish that identifies the color, touch screen Led graphically showing the hand that has been introduced, ergonomic base to place the hands, wrist and forearm, electrical cable, electrical connector vehicle cigarette lighter, rechargeable battery, speaker, access to outside air.

In another, the device is characterized in that it comprises six ports, each with a channel-shaped front of the hands directed into, a nozzle distance to nail of 0.1 mm to 75 mm. In another aspect, the device comprises an opening for dispensing nail polish having a device that connects it to the electronic device, and gives access to the nail polish, which moves through a channel through which passes to the injector and/or applicator.

In another example, the device is characterized by comprising a dispenser containing a nail system that allows you to identify the color of the nail polish which contains the date of last use and the remaining amount in it. In one example, the device is characterized in that it comprises an LED touch screen showing graphically both hands, pointing the fingers and numbering them from 1 to 5, colors are available in the dispenser, the level of remaining nail polish and last date of use. In another example, the device is characterized by comprising an ergonomic base, to place the hand, wrist and forearm.

In one example, the device is characterized by comprising a speaker, which reports that the process is performing. In another example, the device is characterized by comprising an air gap, which allows with the help of an internal fan, the inlet and outlet of air and/or air issuing device. In another example, the device is characterized in that it comprises the operation of capacitive sensors, infrared sensors, motors, nozzles, tubes, compressor, pneumatic valves for painting, device issuing air gears UV lamp for drying nail polish and final lacquer, rechargeable battery and electric cables. In another example, the device is characterized by comprising a Bluetooth or USB port that allows users to download songs to place while the device performs the nail polish.

In one embodiment, the device has a sensor that identifies the hand that has been introduced and activates the device LED touch screen that allows the user to choose the nails and the color you want to paint, without need for specialized personnel to operate and informs the user of visible and audible way the process is performing.

In another embodiment, consists of capacitive and infrared sensors that detect the difference in the surface of the finger and nail, a computer or processor that guides and controls the head with the nail polish hits the surface of the nail. In one embodiment, a device that has issued air towards the nails and then applies a beam of ultraviolet light for rapid and uniform drying.

In another example, the process ended with one hand, the device prompts audibly through the speaker and visual way LED touch screen, the user inserts the other hand to repeat the process.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. An apparatus for the automated painting of human fingernails comprising;
   a housing having two or more apertures, where each such aperture is suitable for the insertion of one or more human digits, including the thumbs;
   one or more sensor components for sensing the position of a finger and its fingernail; and
   one or more moving spray components for applying nail polish or nail enamel on a fingernail surface, where said nail polish or nail enamel application components allow for the application of said polish in an orthogonal direction to said nail surface by positioning in three-dimensional space application components over said one or more fingernails.

2. The apparatus of claim 1 wherein;
   said components for applying nail polish or nail enamel are comprised of one or more moving spray mechanism mounted on a turntable, so that said one or more moving spray mechanism can be moved along the natural arch formed by the human finger ends; and
   said spray mechanism has one or more spray nozzles whose spray axis can be adjusted in three directions (X, Y, Z), as well as movable along one or more arcs, so that the spray may be orthogonal to the nail surface.

3. The apparatus of claim 2 wherein;
said sensor components includes an infrared sensor.

4. The apparatus of claim 3 wherein;
said sensor components includes a capacitive sensor.

5. The apparatus of claim 4 wherein;
said moving spray mechanism includes a gimbaled spray mechanism so as to keep nail polish or nail enamel application component orthogonal to the nail surface.

6. The apparatus of claim 5 wherein;
said housing has six or more openings, with two of those openings suitable for the insertion of a human thumb;
said apparatus further comprises indicators of the operating status of the apparatus for said automated painting of human fingernails unit.

7. An apparatus for the automated painting and drying of finger nails comprising;
an enclosure housing the automated painting and drying of finger nails unit, said enclosure comprising an LED touch screen for graphically showing the hand which has been introduced, an ergonomic base to place the hand, wrist and forearm, one or more openings for the placement of enamel dispensing containers, said containers identifying said enamel's color, electrical cable connectors, speaker, and access to air outside said enclosure, and two or more openings for the insertion of human fingers;
one or more sensors for detecting the position of a finger and the position of the nail within said finger; and
one or more nail polish application mechanisms mounted on a turntable and capable of applying nail polish in an orthogonal direction to said nail surface and of adjusting the position of one or more said nail polish applicators in three directions (X, Y, Z) as well as movable along said turntable arc in reference to said nail surface.

8. The apparatus of claim 7 further comprising;
said enclosure has six finger openings, each opening having a channel, so that the five from one side and the five from the other side form the shape of a human hand; and
one or more of said nail polish application mechanism is comprised of a painting nozzle, with a nozzle distance to nail adjustable between 0.1 mm to 75 mm.

9. The apparatus of claim 8 wherein;
said one or more nail polish application mechanism is comprised of both capacitive sensors and infrared sensors;
said nail painting system is comprised of one or more motors, one or more nozzles, one or more tubes, one or more compressors, one or more pneumatic valves for painting, an air issuing device, gears, and a UV lamp for drying enamel and lacquer finish.

10. The apparatus of claim 9 wherein;
one or more of said enamel dispensing containers connects to the one or more nail polish applicators and provides access to the nail polish or enamel glaze so that when moved through a channel said nail polish or enamel glaze passes to the injector and/or applicator.

11. The apparatus of claim 10 wherein;
said enamel dispenser containers allow for the identification of the color of enamel, date of last use and the remaining amount in the same.

12. The apparatus of claim 11 wherein;
said LED touch screen shows graphically the hand in place, points the fingers and numbers them from 1 to 5, colors that are available in the dispenser, the level of remaining glaze and the last date of use.

13. The apparatus of claim 12 wherein;
said enclosure comprises a speaker.

14. The apparatus of claim 13 wherein;
said enclosure has an air opening, which allows for cross ventilation through the help of an internal fan.

15. The apparatus of claim 14 wherein;
the enclosure includes a USB port that allows users to download songs to play while the device performs the nail polish.

* * * * *